United States Patent Office 2,864,778
Patented Dec. 16, 1958

2,864,778

PROCESS FOR PREPARING FOAMABLE CARBON DIOXIDE-CONTAINING STYRENE POLYMER COMPOSITION AND FOAMABLE COMPOSITION THEREOF

John L. Mladinich, Springfield, Mass., assignor to Monsanto Chemical Company, St. Louis, Mo., a corporation of Delaware No Drawing. Application August 8, 1956
Serial No. 602,914

4 Claims. (Cl. 260—2.5)

The present invention relates to novel foamable styrene polymer compositions.

Styrene polymer foams constitute a valuable class of materials which are finding increasingly wide application in the fabrication of numerous industrial and consumer articles. The most valuable of such styrene polymer foams have very small pore sizes and it would be desirable to have available to the art foamable styrene polymer compositions which yield foams having smaller pore sizes than those presently available to the art.

It is an object of this invention to provide novel foamable styrene polymer compositions.

Another object of this invention is to provide novel foamable styrene polymer compositions which yield styrene polymer foams having a desirable small pore size.

Other objects and advantages of this invention will become apparent from the following detailed description thereof.

The above objects are obtained by incorporating minute quantities of carbon dioxide in foamable styrene polymer compositions which contain an aliphatic hydrocarbon as a foaming agent.

The following examples are set forth to illustrate more clearly the principle and practice of this invention to those skilled in the art. All parts are by weight.

EXAMPLE I

Part A

Styrene monomer is placed in a vented autoclave and dry, oxygen-free carbon dioxide is bubbled therethrough at a steady rate over a period of 4 hours. The styrene monomer absorbs approximately 0.4% of its weight of carbon dioxide.

Part B

The carbon dioxide containing styrene monomer of Part A is mixed with freshly distilled styrene monomer to prepare styrene monomer containing, respectively, 0.2 weight percent, 0.1 weight percent, 0.05 weight percent, 0.005 weight percent and 0.0002 weight percent dissolved carbon dioxide.

Part C

Five percent pentane and one percent benzoyl peroxide are incorporated in each of the styrene monomer samples prepared in Part B and the pentane and carbon dioxide containing monomers are polymerized by being maintained for 30 days at 35° C. The resulting polymers are ground to a size of 8–20 mesh and foamed by placing the polymer particles in boiling water for 10 minutes. Each of the foams has a smaller pore size than is obtained in foams prepared from similarly prepared polystyrene, having only pentane dissolved therein.

EXAMPLE II

Styrene monomer containing 0.1 weight percent carbon dioxide is mass polymerized following the procedure set forth in Example I of U. S. Patent No. 2,675,362. The mass polymer is ground to a particle size of 8–20 mesh and steeped in a large excess of pentane for 24 hours at 25° C. with constant agitation being provided to prevent agglomeration of the polymer particles. The resulting foamable styrene polymer particles are recovered by filtration and dried in shallow open tray evaporators to remove excess pentane. The product contains approximately 10 weight percent pentane. The foamable polymer particles are foamed by placing the particles in boiling water for ten minutes to obtain a fine pore size foam comparable to that obtained in Example I, Part C.

The compositions of this invention comprise a styrene polymer having substantially homogeneously incorporated therein a low-boiling aliphatic hydrocarbon as a foaming agent and a minute quantity of carbon dioxide. The carbon dioxide is incorporated in the styrene polymer in the amount of at least about 0.0002 weight percent and preferably at least about 0.05 weight percent of the total composition. The upper quantity of carbon dioxide employed will not ordinarily exceed about 0.4 weight percent of the total composition.

The styrene polymers included in the compositions of the invention are homopolymers of styrene and interpolymers of styrene containing a predominant proportion of styrene, e. g., greater than 50 weight percent and preferably greater than 75 weight percent styrene. Examples of monomers that may be interpolymerized with the styrene include the conjugated 1,3-dienes, e. g., butadiene, isoprene, etc., alpha, beta-unsaturated monocarboxylic acids and derivatives thereof, e. g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of the styrene polymer with other polymers may be employed, e. g., blends of the styrene polymer with rubbery diene polymers, or the analogous compositions obtained by dissolving a rubbery diene polymer in the styrene monomer and subsequently polymerizing the mixture. In any of the above type resins, all or a portion of the styrene may be replaced with its closely related homologues such as alpha-methylstyrene, o-, m-, and p-methylstyrenes, o-, m-, and p-ethylstyrenes, 2,4-dimethylstyrene, etc. In general, the styrene polymers employed should preferably have a molecular weight in the range of about 40,000–80,000 (as determined by the Staudinger method).

The foaming agents included in the compositions of the invention are volatile aliphatic hydrocarbons boiling within the range of from about 10° C. to about 80° C. and preferably within the range of from about 30° C. to about 60° C. Examples of such hydrocarbons include pentane, cyclopentane, hexane, heptane, petroleum ethers boiling within the previously described temperature ranges, etc. It is permissible, and in some cases, desirable to admix other volatile organic liquids with the aliphatic hydrocarbon. In particular, good results frequently are obtained employing mixtures of volatile aliphatic hydrocarbons and lower halogenated hydrocarbons such as methylene chloride.

The carbon dioxide is most conveniently incorporated into the foamable styrene polymer by preparing the styrene polymer from a styrene monomer having carbon dioxide dissolved therein. Alternately, the styrene may be polymerized by any desired polymerization process while maintaining an atmosphere of carbon dioxide, preferably at superatmospheric pressure, over the monomer. In effect the carbon dioxide is dissolved in the monomer while polymerization is taking place. It is also possible by employing special techniques to incorporate carbon dioxide in a carbon dioxide-free styrene polymer. For example, small quantities of solid $CO_2$ may be admixed with styrene polymer granules and the resulting mixture passed through a gas-tight, screw-type extruder.

The carbon dioxide containing foamable styrene polymer compositions of this invention can be fabricated into foam articles by conventional techniques such as extrusion and steam impulse molding to prepare styrene polymer foams having fine pore sizes.

The above descriptions and particularly the examples are set forth by way of illustration only. Many other variations and modifications thereof will be obvious to those skilled in the art and can be made without departing from the spirit and scope of the invention herein disclosed.

What is claimed is:

1. A composition of matter comprising a foamable styrene polymer having incorporated therein a foam-producing quantity of an aliphatic hydrocarbon boiling in the range of 10–80° C. and carbon dioxide in the amount of at least about 0.0002 weight percent of the total composition.

2. A composition as in claim 1 wherein the carbon dioxide constitutes at least about 0.05 weight percent of the total composition.

3. A process for preparing foamable styrene polymer compositions which consists essentially of polymerizing styrene monomer having at least about 0.0002 weight percent of carbon dioxide dissolved therein to prepare a solid thermoplastic styrene polymer and incorporating in said styrene polymer a foam producing quantity of an aliphatic hydrocarbon boiling in the range of 10–80° C.

4. A process as in claim 3 wherein the styrene monomer has at least about 0.05 weight percent of carbon dioxide dissolved therein.

References Cited in the file of this patent
UNITED STATES PATENTS

| | | |
|---|---|---|
| 2,462,354 | Brubaker et al. | Feb. 22, 1949 |
| 2,681,321 | Stastny et al. | June 15, 1954 |